United States Patent [19]

Prokop

[11] E Re. 29,414

[45] Reissued Sept. 27, 1977

[54] SHIFT MECHANISM FOR MECHANICAL TRANSMISSIONS

[75] Inventor: Josef F. Prokop, Downers Grove, Ill.

[73] Assignee: International Harvester Company, Chicago, Ill.

[21] Appl. No.: 592,569

[22] Filed: July 2, 1975

Related U.S. Patent Documents

Reissue of:

[64] Patent No.: 3,730,010
Issued: May 1, 1973
Appl. No.: 185,107
Filed: Sept. 30, 1971

[51] Int. Cl.[2] ..... G05G 5/10

[52] U.S. Cl. ..... 74/477; 74/473 R; 74/476

[58] Field of Search ..... 74/473 R, 475, 476, 74/477

[56] References Cited

U.S. PATENT DOCUMENTS

| | | | |
|---|---|---|---|
| 3,192,793 | 7/1965 | Hurst et al. | 74/476 |
| 3,572,152 | 3/1971 | Bruhn et al. | 74/476 |

*Primary Examiner*—Allan D. Herrmann
*Assistant Examiner*—Randall Heald
*Attorney, Agent, or Firm*—William W. Wendell; Floyd B. Harman

[57] ABSTRACT

A single control lever [pivotally] *with an internal junction* actuating a latch [progressively] *by progressive pivoting* in a first and a second plane. When it is desired to change from one to another of two transmission gear set levers, the latch is pivoted from a gap contained therein through a fixed gate into a gap contained in the other transmission gear set lever. The shift being possible only when the two gaps and the gate define a common plane.

8 Claims, 4 Drawing Figures

SHIFT MECHANISM FOR MECHANICAL TRANSMISSIONS

Matter enclosed in heavy brackets [ ] appears in the original patent but forms no part of this reissue specification; matter printed in italics indicates the additions made by reissue.

BACKGROUND OF THE INVENTION

This invention relates to mechanical transmission shift controls and has particular reference to a gear shift selector assembly whereby the operator may, by manipulation of a single hand-operated lever, select one of several of the driving gear sets of the mechanical transmission.

Present day hand-operated shift controls of this type leave a great deal to be desired from the standpoint of cost, durability, and ease of operation. Further, the possibility of unintended shifting from one speed to another, or from any forward speed to a reverse speed always presents a constant hazard.

It is therefore an object of the invention to provide a durable and inexpensive shift assembly.

A further object of this invention is to provide a shift assembly which minimizes the possibility of accidentally shifting from one speed to another or from a forward to a reverse gear position.

Another object of this invention is to provide a gate means which prevents shifting until a predetermined orientation of the gears is achieved.

Another object of this invention is to provide a shift assembly having a single control lever whereby one may shift simply and easily to and from the various gear positions.

Other objects and many of the attendant advantages of this invention will be readily appreciated as the same becomes better understood by reference to the following detailed descriptions when considered in conjunction with the accompanying drawings in which like reference numbers designate like parts throughout the figures thereof and therein:

DESCRIPTION OF THE PREFERRED EMBODIMENT

Figure 1:
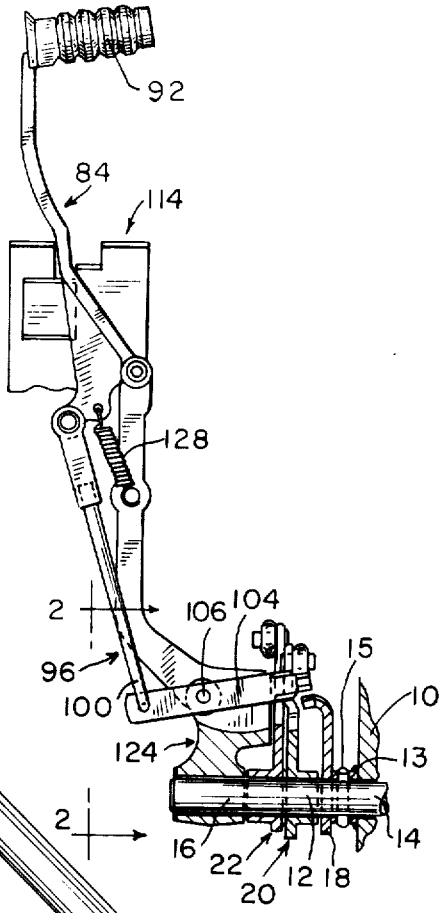
FIG. 1 is a cross sectional view of the shift assembly of the present invention with the operating handle and the transmission in the neutral position.
Figure 2:
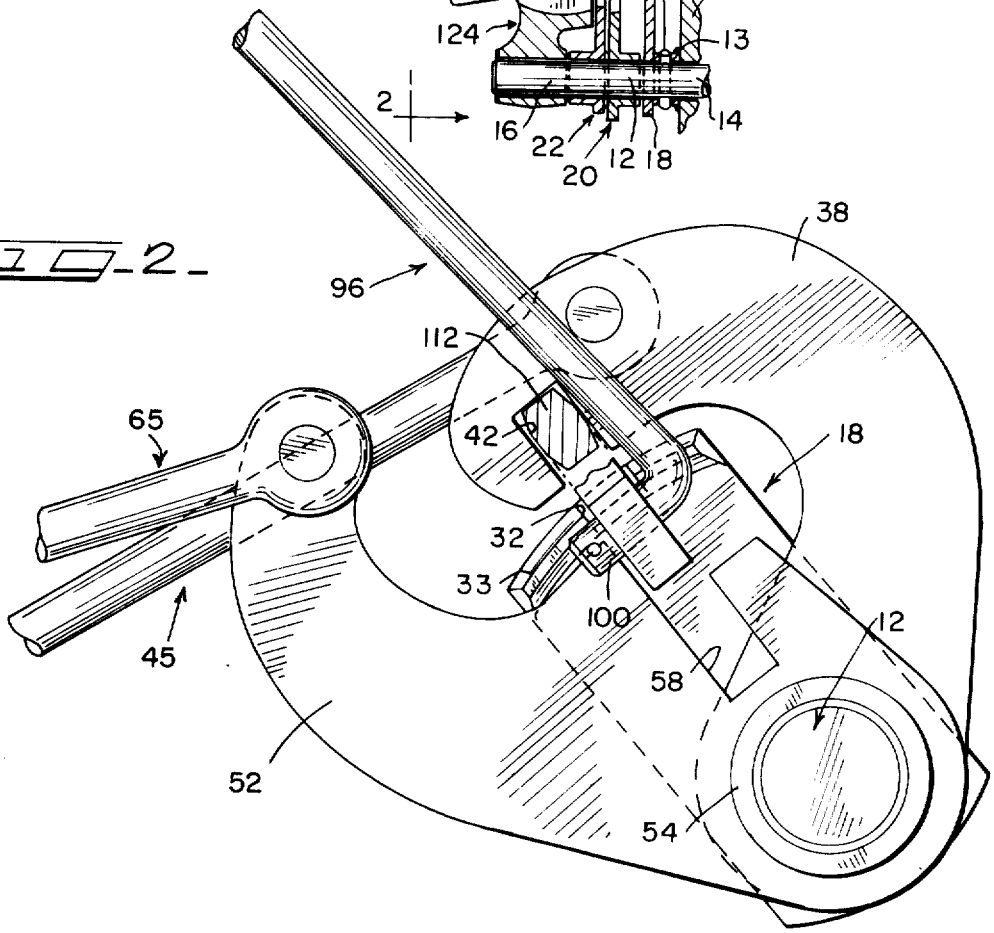
FIG. 2 is a section on the line 2—2 of FIG. 1.
Figure 3:
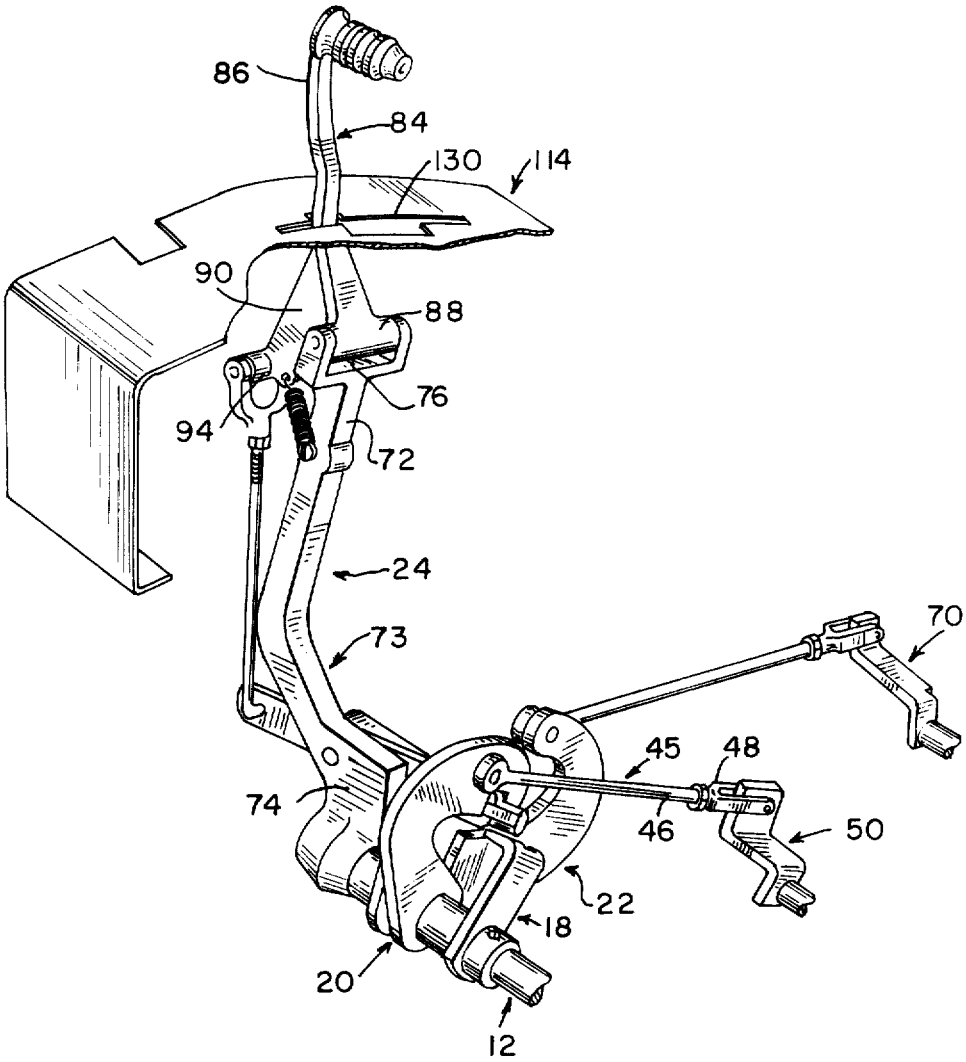
FIG. 3 is a side view of the shift assembly and control handle thereof embodying the invention.

Referring now to the drawings and more particularly to FIGS. 1 and 2 wherein 10 represents the frame of a vehicle (not shown). Extending out from frame 10 is a support means or shaft 12, a first section 14 thereof being fixed to frame 10 by a suitable means such as welding or a spring pin means 13. The other or second section 16 of support means 12 carries in order a series of components: a gate means 18, a pivotally secured inner lever means 20, a pivotally secured outer lever means 22 and a pivotally secured control handle means 24. That is, the outer lever means 22 is disposed to one side of the control handle means 24, the inner lever means 20 is disposed to one side of the outer lever 22 and the gate 18 is disposed to one side of the inner lever 20.

The gate means 18 is of generally rectangular form, having a washer or sleeve means 26 fixed to its lower extreme 28, both of which are journalled by support means 12 and fixed thereto by a suitable means such as a spring pin means 15. The upper extreme 30 has a slot or gap means 32 formed therein. As shown in the preferred embodiment, the top 33 of gate means 18 is bent 90° such that an L-shaped member is formed, the gap means 32 being centered therein and extending parallel to the major plane thereof.

The inner lever means 20 comprises a hook shaped member having a lower extreme 34 provided with a washer or sleeve means 36, both of which are journalled by support means 12. The upper extreme 38 bends over forming an angle of substantially more than 90° with the majority of the member. The lower edge 40 thereof being provided with a gap or slot means 42. Pivotally fixed to the top edge 44 thereof is a force transfer means 45 being fixed to the transmission (not shown) and actuating one gear set thereof.

Force transfer means 45 includes a link 46 which, in turn, is adjustably fixed to a clevis means 48. The clevis means 48 is pivotally fixed to a bracket and shaft means 50 which controls the gear setting of a transmission (not shown), a choice of low, neutral and reverse settings being available.

The outer lever means 22 has a curved body portion 52 and a sleeve means 54 adjacent to and fixed to lower extreme 56. Both the sleeve means 54 and the lower extreme 56 are journalled by support means 12. A notch or gap means 58 is provided in the upper edge 60 of the lower extreme 56, extending perpendicularly to the major plane of outer lever means 22. The upper extreme 62 is provided with a force transfer means 65 being fixed to the transmission (not shown) and actuating a gear set thereof. The force transfer means 65 includes: link means 66 adjustably engaging clevis means 68, which, in turn, is secured to a bracket and shaft means 70 which moves the gear setting of a transmission (not shown), a choice of neutral and high settings being available.

The control handle or lever means 24 includes a base or dog-leg shaped lever means 73 having top 72 and bottom 74 extreme portions. The top extreme 72 carries a clevis 76 suitably fixed thereto. The bottom extreme 74 is provided wih a transversely extending channel 78, a transversely extending aperture 80 perpendicular to the major plane [thereof] *of said channel* and an aperture means 82 suitable for journalling by support means 12. A bellcrank lever or extension lever means 84 having an input link 86, an elbow means 88 and an output link 90 is secured to the dog-leg lever means 73 by the pivotal juncture of said clevis 76 and said elbow means 88. The top end 91 of input link 86 has a grip bar 92 secured thereto, the end 94 of output link 90 is provided with a connecting means or link 96 fixed by an adjustable clevis means 98. The lower end 100 of link 96 is pivotally secured to the first end 102 of a hinged latch means 104.

Figure 4:
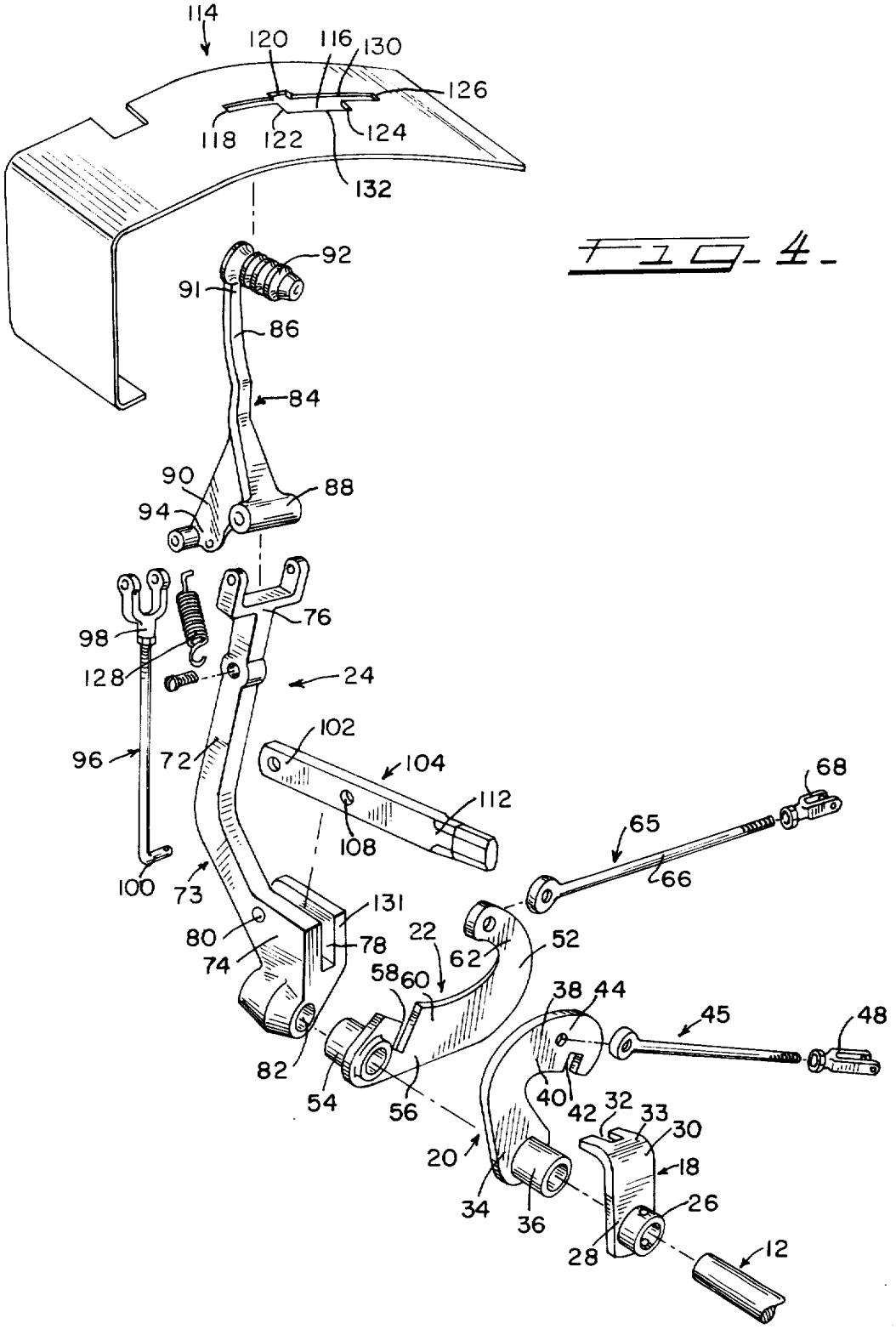
FIG. 4 is an exploded review of the shift assembly of the present invention.

As shown in FIGS. 1 and 4, latch means 104 is hingedly positioned in channel 78 by a pin means 106 passing through aperture 80 in bottom extreme 74 and aperture 108 in latch means 104. The second end 112 is tapered and beveled to allow easier movement between the gaps 32, 42 and 58.

Fixed over the shift mechanism is a housing assembly means 114 having a channel 116 with a series of shoulders [118, 120, 122, 124 and 126] cut therein, corresponding to neutral as well as different transmission gears. *This series of shoulders includes shoulder 118 in the reverse gear setting range, shoulder 126 in the low gear setting range and shoulders 122 and 124 in the high gear setting range, with shoulders 120 and 122 aligned in the neutral position of the shift mechanism.* A tension spring 128 fixed to output link 90 and dogleg lever means 73 functions as a deadman's means continuously urging input link 86 against side 130 of channel 116[.] *which will cause the input lever 86 to engage the neutral shoulder 120 upon accidental radial displacement of the control handle means 24 about support shaft 12.*

*In accordance with the invention the input lever 86 must be in the neutral position, i.e., aligned with shoulders 120 and 122, before the operator can shift mechanism between the high gear setting and the low-reverse gear settings.*

[In operation, the operator actuates lever means 24 pivoting it in a first plane around shaft means 12 and in a second plane perpendicular to the first when the input link 86 is abutted against either of the neutral shoulders 120 or 122.] When so positioned, the three spaced gap means 32, 42 and 58 form the top, bottom and middle of a common plane as shown in FIG. 2 and latch means 104 can be passed freely therebetween. *To achieve this orientation, the operator must rotate the control handle means 24 in a first plane about support shaft 12 along either side 130 or 132 of the housing assembly means 114.* Thus, if the operator wishes to actuate the reverse gear setting corresponding to shoulder 118 *from this neutral position, he must overcome spring 128 in rotating the input lever 86 in a second plane about its junction with clevis 76 until he can freely rotate the control handle means 24 about support shaft 12 and abut the input lever 86 and shoulder 118. During the first rotational movement of input lever 86 within the neutral range, the* [he moves input link 86 in the first plane to abut shoulder 120 or 122 and then in the second plane,] pivoting latch 104 *is pivoted* through bellcrank lever 84 and link 96, past gap 32 in gate 18, into gap 12 in inner lever means 20. [Once so engaged, the control handle means 24 is pivoted again in the first plane about shaft 12 until input link 86 abuts shoulder 118.] Simultaneously [therewith] *with the second rotation* inner lever means 20 pivots through the same angle as handle lever 24 since their major planes are parallel. If the operator wishes to actuate the high gear setting corresponding to shoulder 124, a similar series of steps are followed including: abutting input link 86 and shoulder 122[,] *thereby* pivoting latch through gap 32 into gap 58 [, thereby engaging] *to engage* outer lever means 22 *and rotating the control handle means 24 to abut input lever 86 and shoulder 124.*

The provisions of the gate 18 between transmission settings allows the combination of two different transmission actuating means into a single shift lever assembly avoiding the problems of gear jamming. As is apparent, the control handle means 24 must be positioned to align the gaps 32, 42 and 58 and then input link 86 must be pivoted to abut shoulder 120 or overcoming tension spring 128, shoulder 122, thereafter, control handle means 24 must be pushed to the desired gear setting indicated on housing assembly means 114, a series of functions the accidental performance of which is unlikely.

The links 46 and 66 being in a threaded engagement with the corresponding clevises 48 and 68 allow for relationship adjustments therebetween as well as with gap 32. It is thus apparent that if a part or parts of the shift mechanism should become bent, realignment can be simply re-established.

It should be further noted that the front face 131 of control lever means 24 forms a parallel plane with the major parallel planes of inner lever means 20 and outer lever means 22, all three planes being in close proximity with each other. Thus when latch end 112 is engaged in gap 42 or 58 and the control lever means 24 is being actuated [in the first plane] *by rotation about support shaft 12* the forces generated thereby will not cause bending or deflection thereof. Such bending of latch end 112 could result in an improper signal being transmitted to the transmission gear set resulting in damage thereto.

The invention may be embodied in other specific forms without departing from the spirit or essential characteristics thereof. The present embodiments, are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A shift mechanism for a mechanical transmission having several gear sets comprising:

a support shaft means, a latch means, a lever means *having a junction therein* for actuating said latch means [progressively] *by progressive pivoting* in a first and second plane, and being journalled by said support shaft means, an outer lever means adapted to be connected to said transmission having a gap means capable of accommodating said latch and being journalled by said support shaft means;

an inner lever means adapted to be connected to said transmission having a gap means capable of accommodating said latch and being journalled by said support shaft means; and a single gate means having a gap means capable of passing said latch means and a base fixed to said support shaft means whereby when said gaps are orientated in *the neutral position of* said second plane, said latch is movable in an up and down manner therein to engage a transmission gear set means [, and] *upon* said lever means [is moved] *pivoting about said junction* in said second plane.

2. The shaft control assembly of claim 1 wherein:

said outer lever means is disposed to one side of said lever means;

said inner lever means is disposed to one side of said outer lever means; and said gate means is fixedly secured to said support shaft to one side of said outer lever means.

3. The shift control assembly of claim 2 wherein: all of said sides are the same.

4. The shift control assembly of claim 1 wherein: said gate, said inner lever means and said outer lever means have parallel major planes.

5. The shift control assembly of claim 1 wherein: said [second plane has] *latch means pivots in said second plane through a common plane having* a top, middle and bottom portion, said top portion formed by said inner lever gap means, said middle portion formed by said gate gap means and said bottom portion formed by said outer lever gap means.

6. The shift control assembly of claim 1 wherein:

said lever means includes:

a base means pivoting in said [second] *first* plane *about said journalled connection to said support shaft means and* hingedly carrying said latch means;

an extension lever means *pivotally* mounted on said base means *at said junction for* pivoting in said [first] *second* plane; and means connecting said [extending] *extension* lever means to said latch means whereby pivoting of said *extension* lever pivots said latch means.

7. The shift control assembly of claim 6 wherein: said first and second planes are perpendicular.

8. A shift control assembly for a transmission having a single control handle comprising:

a support shaft means;

a latch means;

a control handle means including; a dog-leg base means journalled by said supporting shaft means and pivotally mounting said latch means, a bell-crank lever means pivotally mounted on said dog-leg base means actuating said latch means, and a deadmans means;

an outer lever means adapted to be connected to said transmission having a gap means capable of accommodating said latch, and a base journalled by said support shaft means;

an inner lever means adapted to be connected to said transmission having a gap means capable of accommodating said latch, and a base journalled by said support shaft means and a gate means having a gap means capable of passing said latch and a base fixed to said support shaft means whereby for said latch to pass through said gate all of said gaps must form a common plane.

* * * * *